2 Sheets—Sheet 1.

U. H. ODELL.

ROLLER MILL.

No. 10,139. Reissued June 20, 1882

Attest.
Jno. E. Hike
Herbert G. Cook.

Inventor,
Adolphus H. Odell.
by Wood & Boyd
his Attorneys.

U. H. ODELL.

ROLLER MILL.

No. 10,139. Reissued June 20, 1882.

Attest,
Jno. E. Wiles.
Herbert P. Cook.

Inventor,
Adolphus H. Odell
by Wood & Boyd
his Attorneys.

BEST AVAILABLE COPY

BEST AVAILABLE COPY

UNITED STATES PATENT OFFICE.

UDOLPHO H. ODELL, OF DAYTON, OHIO.

ROLLER-MILL.

SPECIFICATION forming part of Reissued Letters Patent No. 10,139, dated June 20, 1882.

Original No. 250,954, dated December 13, 1881. Application for reissue filed April 3, 1882.

250954

*To all whom it may concern:*

Be it known that I, UDOLPHO H. ODELL, formerly of Minneapolis, Minnesota, but now of Dayton, Montgomery county, Ohio, have invented certain new and useful Improvements in Roller-Mills, of which the following is a specification.

My invention relates to improvements in roller-mills for crushing or grinding grain, middlings, and other material, and has for its object to provide novel and efficient means for adjusting the outer crushing or grinding rolls to or from the inner ones, and simultaneously with such adjustment operating the hopper-gate mechanism to open or close the spouts or channels which control the discharge of grain from the hopper to the feed-rolls.

The invention also has for its object to provide novel and efficient means for simultaneously stopping and starting the crushing or grinding operation of roller-mills.

Figure 1:
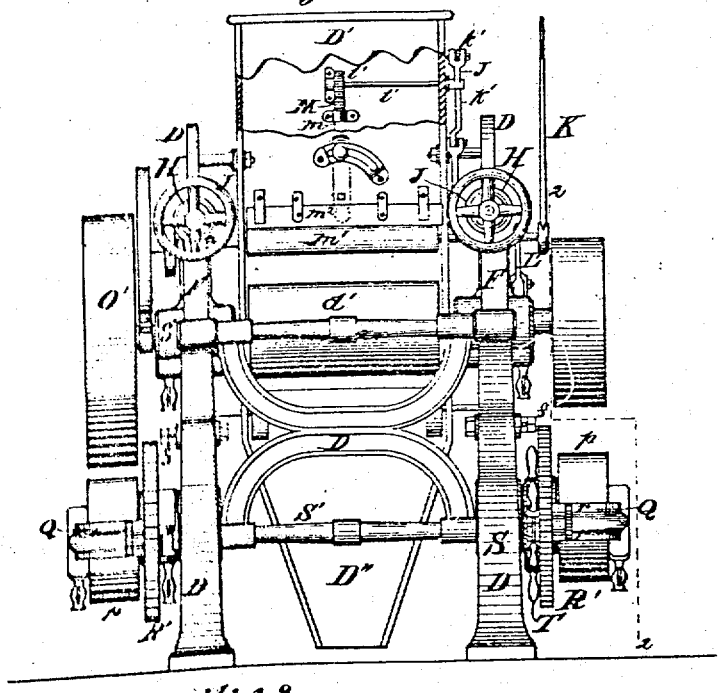
Figure 3:
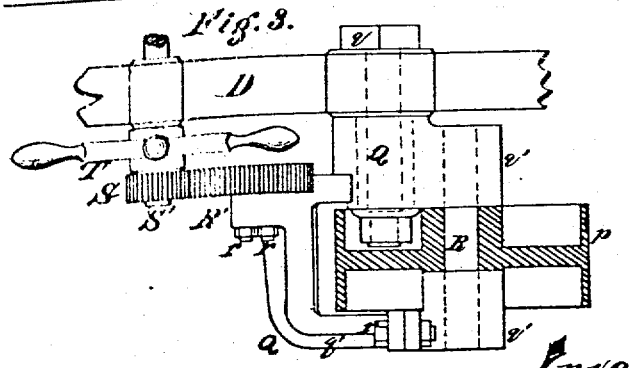
Figure 2:
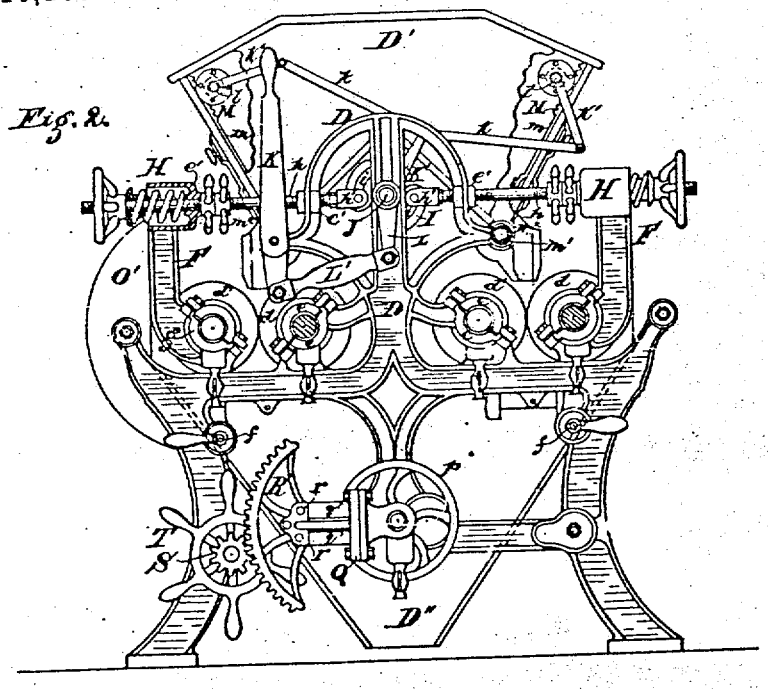
Figure 4:
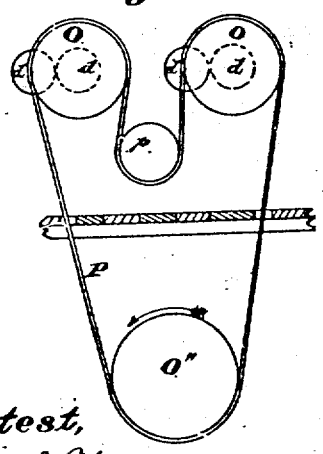
Figure 5:
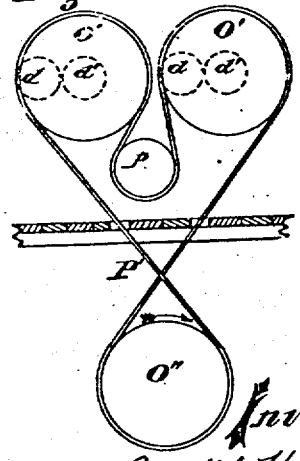

These objects I attain by the mechanism illustrated in the accompanying drawings, in which Figure 1 represents an end elevation of a four-roll crushing or grinding mill embodying my invention. Fig. 2 represents a side elevation of the same on the line 2 2 of Fig. 1, the pulleys to the right of this line being omitted in order to more clearly illustrate the parts. Fig. 3 represents a detail plan view, partly in section, of one of the tightening-pulleys and its supporting-frame. Fig. 4 is a diagram showing the arrangement of the fast-speeded crushing or grinding rolls and belt-connections, and Fig. 5 is a similar view showing the opposite side of the machine.

Referring to the drawings, the letter D indicates the frame-work of the machine, D′, the hopper, and D″ the discharge-chute beneath the crushing or grinding rolls.

*d d* indicate the fast-speeded and *d′ d′* the slow-speeded crushing or grinding rolls.

*e* indicates the journal-bearings for the two inner rolls, which are rigidly attached to the frame D of the machine.

The letters F indicate oscillating or swinging arms, pivoted at their lower ends to the frame of the machine by bolts, as at *f*.

*g* indicates the journal-bearings for the two outer rolls, *d d′*.

H H indicate housings cast or otherwise provided on the upper ends of the arms F.

*h h* indicate two horizontal shafts supported in bearings *e′ e′* in the housings H and on the frame D, the inner ends of which shafts *h h* are forked and engage the segmental cam-slots *i* in the links I by a bolt which passes through the forks *h′* and through the said slots. The links I are keyed upon a through-shaft, J, to which latter is also keyed a crank, L.

L′ indicates a link-rod connecting the crank L with the vertical pivoted hand-lever K.

K′ indicates another crank, keyed upon the through-shaft J, inside of the link I and opposite the crank L.

The letters *k′ k′* indicate crank-rods pivoted at one end to the links *k k*, which latter are both attached to the crank K′, and the other ends of the said crank-rods are connected with the shafts *l*, which are journaled in the sides of the hopper. Upon the shafts *l* within the hopper are fixed the pinions *l′*, which mesh into the racks M on bars *m*, which carry at their lower ends the gates or slides *m²*. These slides, when in a closed position, rest upon feed-rollers *m′*, of the usual construction, and serve to close up the spout or feed-channels which conduct the grain from the hopper to the feed-rollers, from which the grain is discharged between the crushing-rolls.

The crushing or grinding rolls *d d′* are mounted on through-shafts having bearings at each end similar to those shown in Fig. 2, and the shaft J passes through to the opposite side of the machine, and has duplicate links I, connecting-rods, and cranks connected with forked shafts and to pinions, in the same manner as shown in Fig. 2. When the hand-lever K is pulled toward the operator an outward swinging motion is imparted to the pivoted arms F, which support the outer rolls, *d d′*, through the instrumentality of the link L′, crank L, through-shaft J, links I, and shafts *h*, thereby forcing the said outer rolls, *d d′*, away from the inner rolls. Simultaneously with such movement of the lever K and the other parts specified the gates or slides *m²* are moved down upon the feed-rollers *m′* through the instrumentality of the shaft J, links *k*, crank-rods *k′*, shafts *l*, pinions *l′*, racks M, and bars *m*, whereby the feed spouts or channels are closed.

Figs. 7 and 8 represent the preferred form of driving-pulley mounted on one of the shafts

BEST AVAILABLE COPY the fast-speeded rolls, and a similar pulley of the same size is mounted on the other shaft. At the opposite end of the machine two pulleys, O′, of a sufficiently large size to obtain the requisite slow speed, are mounted on the shafts of the slow-speeded rolls. These two sets of pulleys, O O′, are driven by separate driving-belts from a main shaft.

P P′ indicate the belts.

*p* indicates the tightener-pulleys; Q, pivoted forked levers, *q*, the pivot-bolts by which they are attached to the main frame, and *g′ g′* the forked ends of the levers.

R indicates the shafts on which the tightening-pulleys *p* are journaled, and R′ segmental gears attached to the ends of levers Q by means of bolts *r r*.

S indicates pinions keyed to the through-shaft S′, which is journaled in or on the frame D.

T indicates a hand wheel or lever keyed to the through-shaft S′, which shaft passes across the frame of the machine transversely from end to end, as shown in Fig. 1. The two tightening-pulleys *p* can be adjusted to or from the belts P P′ by rotating the shaft S′ through the instrumentality of the rotating hand-wheel T, which has the effect of swinging the forked levers Q on their pivot-bolts *q*, (see Fig. 3,) and either raising or lowering the forked ends of the levers which carry the shafts R of the tightening-pulleys, according to the direction in which the shaft S′ is rotated by the hand wheel or lever T. By this means the machine may be instantly stopped or started by means of the lever operating the tightener-pulleys.

Fig. 7 shows the mode of belting from the main-frame pulley O″ to the pulleys O O of the fast-speeded rolls, with the tightening-pulleys in position to drive the same. Fig. 8 is a similar plan of driving the slow-speeded rolls, the only difference being in the size of the pulleys to obtain the two different speeds at which the crushing or grinding rolls are driven.

Instead of arranging the belts P P′ to run one over the fast-speeded rolls, the belts may be each made to drive one fast and one slower speeded roll by changing the size of the pulleys, so that each set of crushing-rollers is driven by belts at the opposite ends of the machine, as the tightening-pulley P′ will permit either belt to run over pulleys O O′ O″. This manner of belting the crushing or grinding rolls in order to drive them with varying or differential speed is not, however, herein claimed, and is only here illustrated to give a clear conception of the entire structure.

What I claim is—

1. In a roller-mill, the combination of the hopper-gate mechanism on both sides of the machine with a through-shaft, lever mechanism connecting the parts to operate the gates simultaneously, and a single hand-lever, substantially as and for the purpose described.

2. In a roller-mill, the combination, with the adjustable rolls and journals, of transverse shafts *h*, a through-shaft, J, link mechanism connecting the said shafts, and a single hand lever, K, connected with the through-shaft, for simultaneously adjusting both sets of rolls by a single lever movement, substantially as described.

3. In a roller-mill, the combination of two sets of crushing or grinding rolls, belt and pulley driving devices, the tightener-pulleys, adjustable frames therefor, and mechanism for simultaneously raising and lowering the frames and tightener-pulleys to stop and start the machine, substantially as described.

4. In a roller-mill, the combination, with the adjustable crushing-rolls and the gates or slides which control the passage of grain from the hopper, of a single through-shaft, J, a single hand-lever, K, and mechanism connecting the crushing-rolls and the gates or slides with the through-shaft and hand-lever, substantially as described, whereby a single movement of the lever simultaneously adjusts the rolls and the gates or slides, as set forth.

5. In a roller-mill, the shaft J, provided with the rigidly-attached links I, having segmental slots *i*, combined with the shafts *h*, engaging the slots in said links, the pivoted arms F, carrying crushing or grinding rolls, the crank L, attached to the shaft J, the link L′, and the swinging lever K, all substantially as and for the purpose described.

6. The combination, with the swinging lever K and mechanism, substantially as described, for adjusting the outer crushing-rolls, *d d′*, of the crank K′, the links *k*, the crank-rods *k′*, the shafts *l*, pinions *i′*, the racks, and bars *m*, provided with the gates or slides $m^2$, the construction and arrangement being such that a movement of the swinging lever simultaneously adjusts the crushing or grinding rolls and raises or lowers the gates or slides, for the purposes set forth.

Witness my hand this 11th day of March, 1882.

UDOLPHO H. ODELL.

In presence of—
ROBERT K. KING,
WILLIAM B. SULLIVAN.